US012677955B1

(12) United States Patent
Gerber et al.

(10) Patent No.: US 12,677,955 B1
(45) Date of Patent: Jul. 14, 2026

(54) SOLAR-CHARGED, HEATED FOLDING CHAIR

(71) Applicant: Debbra Hill, Taylorsville, UT (US)

(72) Inventors: Benjamin Gerber, Herriman, UT (US); Justin Malcolm

(*) Notice: Subject to any disclaimer, the term of this patent is extended or adjusted under 35 U.S.C. 154(b) by 855 days.

(21) Appl. No.: 17/498,797

(22) Filed: Oct. 12, 2021

(51) Int. Cl.
| | |
|---|---|
| *A47C 7/74* | (2006.01) |
| *A47C 4/28* | (2006.01) |
| *A47C 7/66* | (2006.01) |
| *G05D 23/19* | (2006.01) |
| *H02J 7/35* | (2006.01) |
| *H05B 1/02* | (2006.01) |
| *H05B 3/34* | (2006.01) |

(52) U.S. Cl.
CPC ................ *A47C 7/748* (2013.01); *A47C 4/28* (2013.01); *A47C 7/66* (2013.01); *G05D 23/1934* (2013.01); *H02J 7/35* (2013.01); *H05B 1/0252* (2013.01); *H05B 3/342* (2013.01)

(58) Field of Classification Search
CPC .. A47C 7/748; A47C 4/28; A47C 7/66; A47C 1/143; G05D 23/1934; H02J 7/35; H05B 1/0252; H05B 3/342

USPC .......................................................... 219/217
See application file for complete search history.

(56) References Cited

U.S. PATENT DOCUMENTS

| | | | |
|---|---|---|---|
| 10,709,250 B2 * | 7/2020 | Smith | A47C 4/286 |
| 2010/0089898 A1 * | 4/2010 | Lee | H05B 1/0272 219/212 |
| 2020/0221876 A1 * | 7/2020 | Morales | A47C 7/66 |

* cited by examiner

*Primary Examiner* — Dana Ross
*Assistant Examiner* — James F Sims, III
(74) *Attorney, Agent, or Firm* — Kyle A. Fletcher, Esq.

(57) ABSTRACT

The solar-charged and heated folding chair is a chair. The solar-charged and heated folding chair incorporates a heating circuit into a chair structure. The heating circuit mounts on the chair structure. The chair structure is a collapsible structure. The heating circuit is an electric circuit. The heating circuit generates heat used to warm an occupant of the chair structure. The heating circuit is independently powered. By independently powered is meant that the heating circuit can operate without an electrical connection to an external power source.

16 Claims, 8 Drawing Sheets

100

101

102

115

111

131

113

102

116

166

115

SOLAR-CHARGED, HEATED FOLDING CHAIR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of chairs adapted with a heating arrangement (A47C7/748)

Summary of Invention

The solar-charged and heated folding chair is a chair. The solar-charged and heated folding chair comprises a chair structure and a heating circuit. The heating circuit mounts on the chair structure. The chair structure is a collapsible structure. The heating circuit is an electric circuit. The heating circuit generates heat used to warm an occupant of the chair structure. The heating circuit is independently powered. By independently powered is meant that the heating circuit can operate without an electrical connection to an external power source.

These together with additional objects, features and advantages of the solar-charged and heated folding chair will be readily apparent to those of ordinary skill in the art upon reading the following detailed description of the presently preferred, but nonetheless illustrative, embodiments when taken in conjunction with the accompanying drawings.

In this respect, before explaining the current embodiments of the solar-charged and heated folding chair in detail, it is to be understood that the solar-charged and heated folding chair is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the solar-charged and heated folding chair.

It is therefore important that the claims be regarded as including such equivalent construction insofar as they do not depart from the spirit and scope of the solar-charged and heated folding chair. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
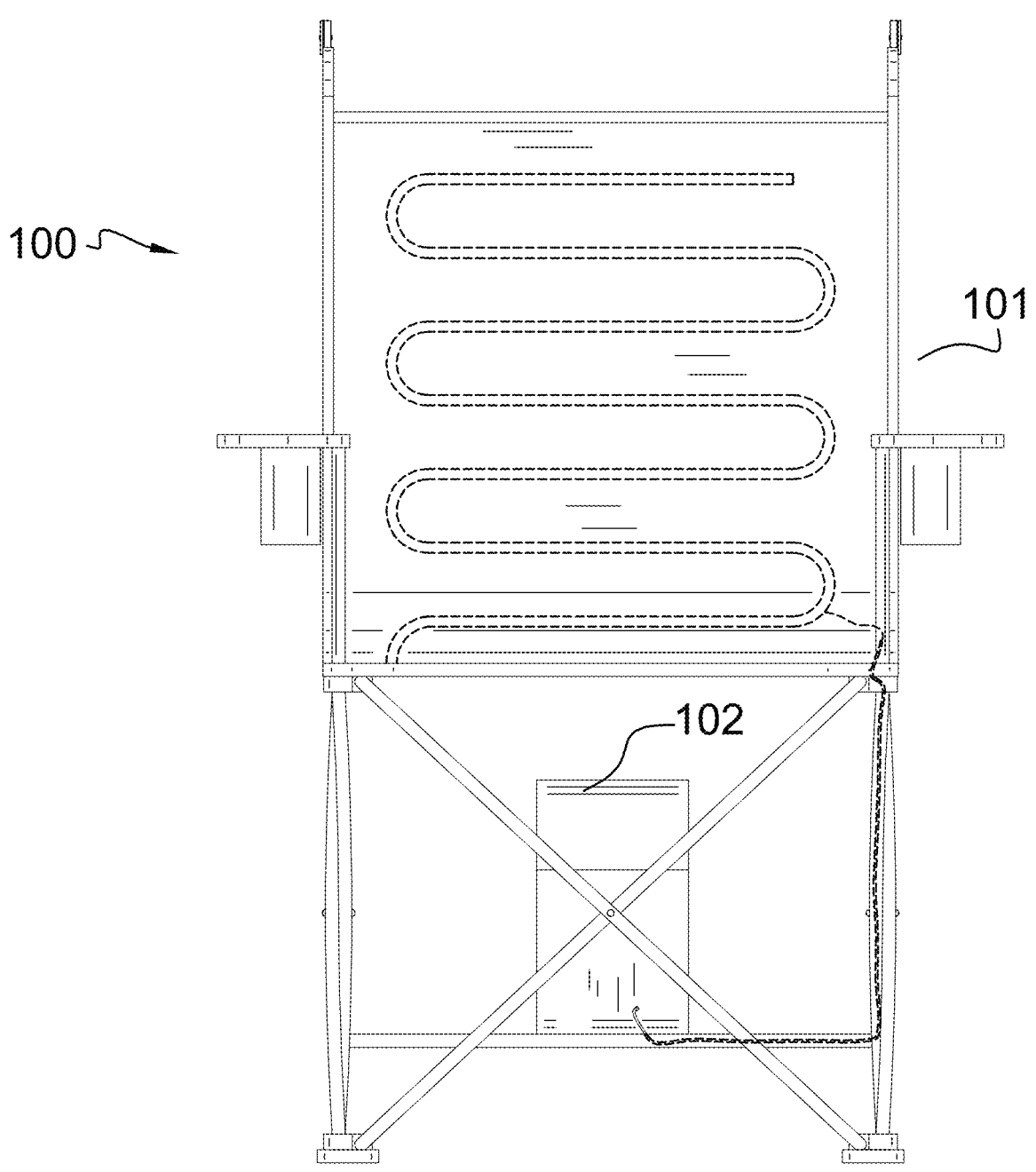
FIG. 1 is a front view of an embodiment of the disclosure.
Figure 2:
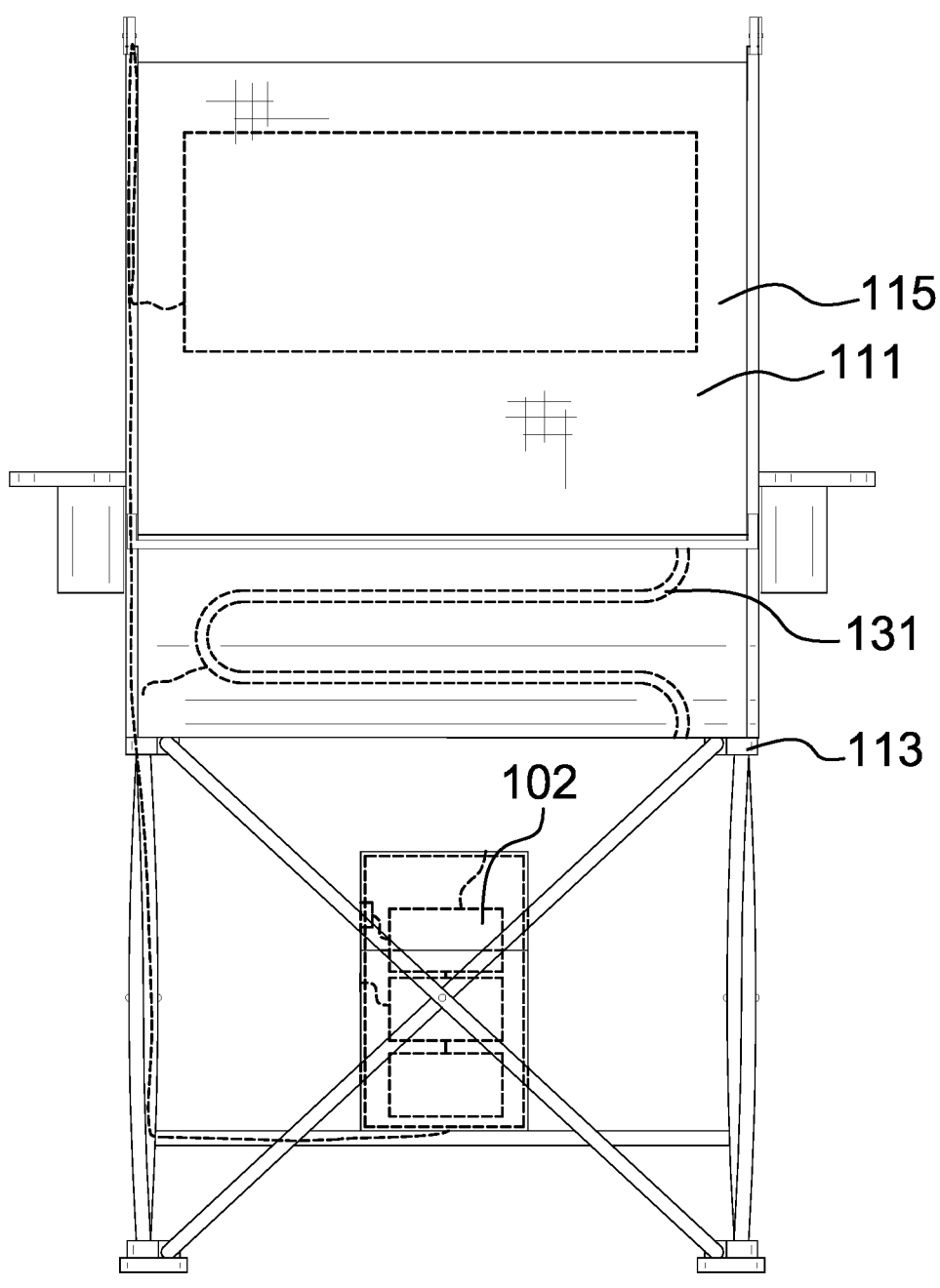
FIG. 2 is a rear view of an embodiment of the disclosure.
Figure 3:
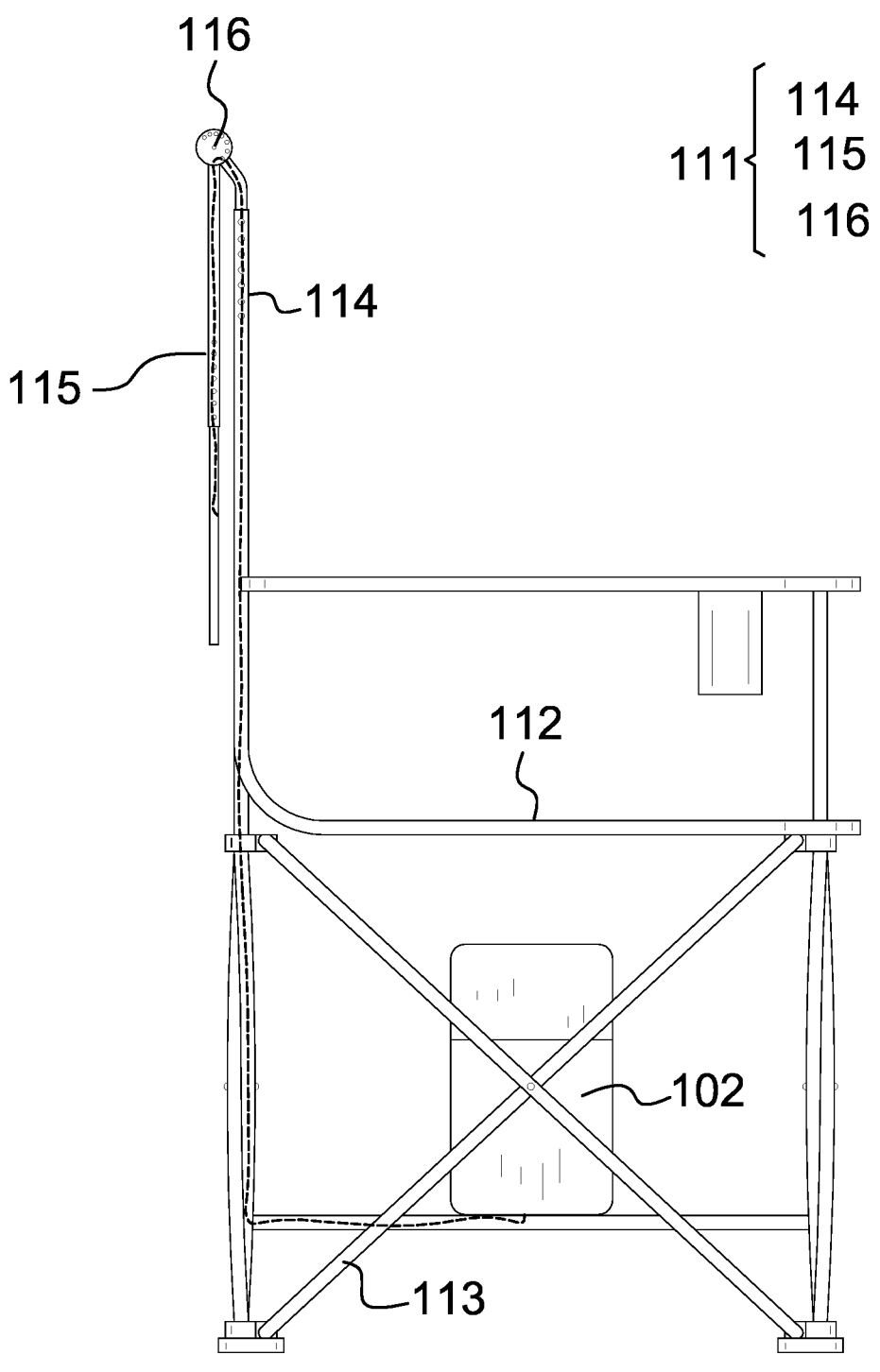
FIG. 3 is a side view of an embodiment of the disclosure.
Figure 4:
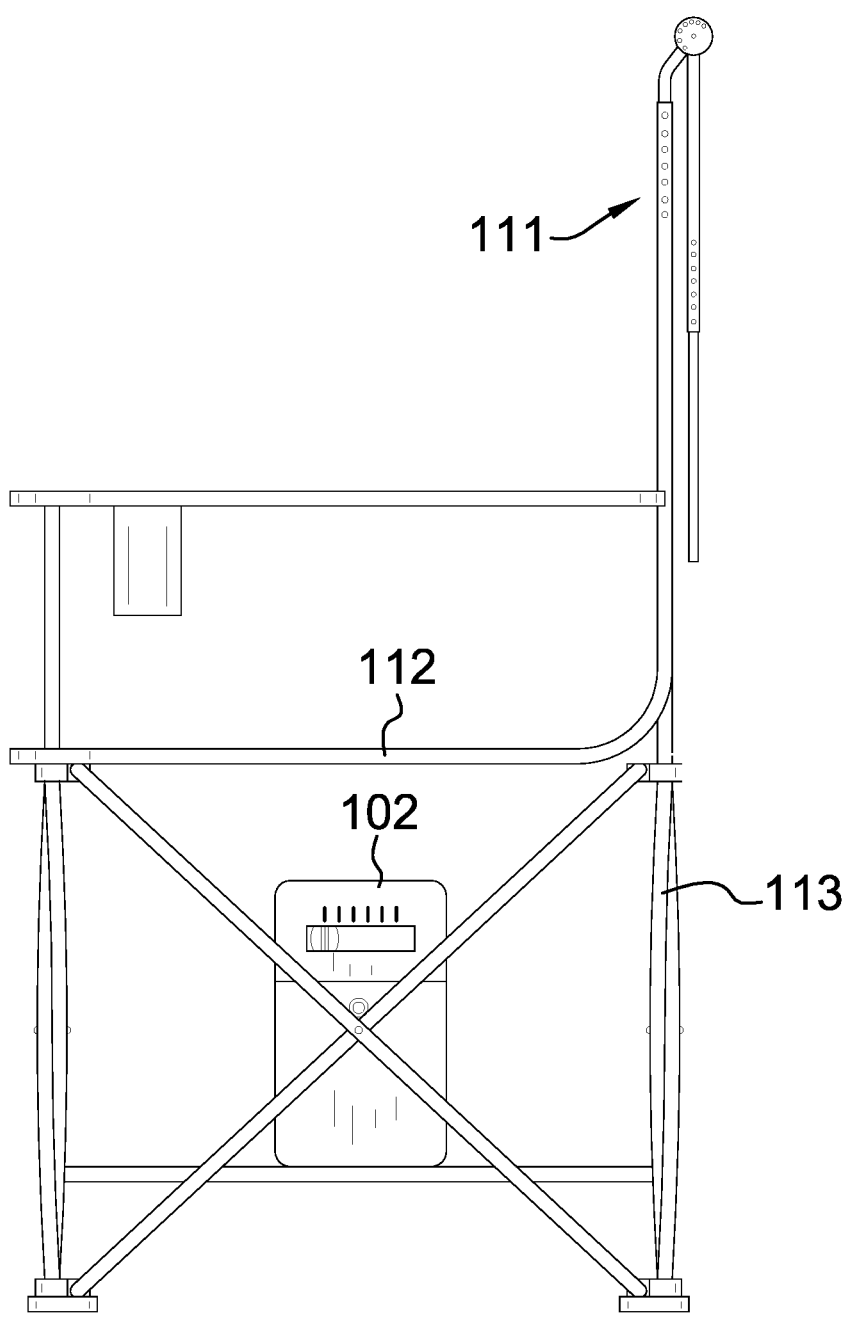
FIG. 4 is a reverse side view of an embodiment of the disclosure.
Figure 5:
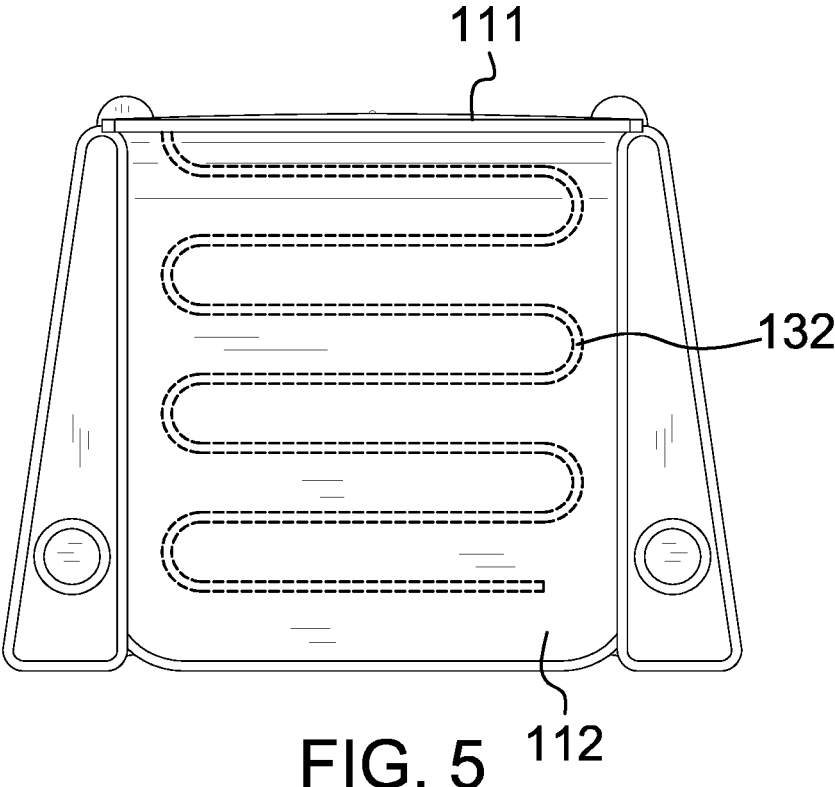
FIG. 5 is a top view of an embodiment of the disclosure.
Figure 6:
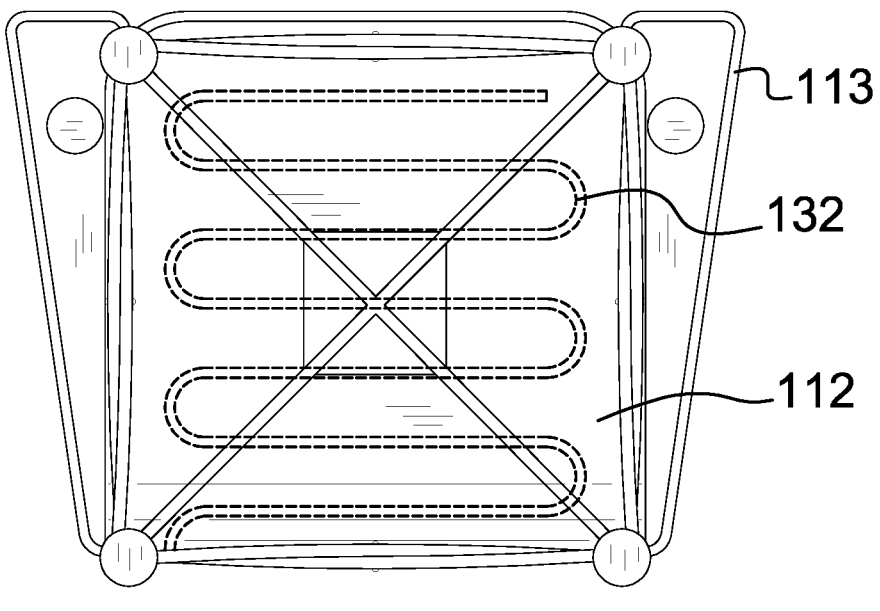
FIG. 6 is a bottom view of an embodiment of the disclosure.
Figure 7:
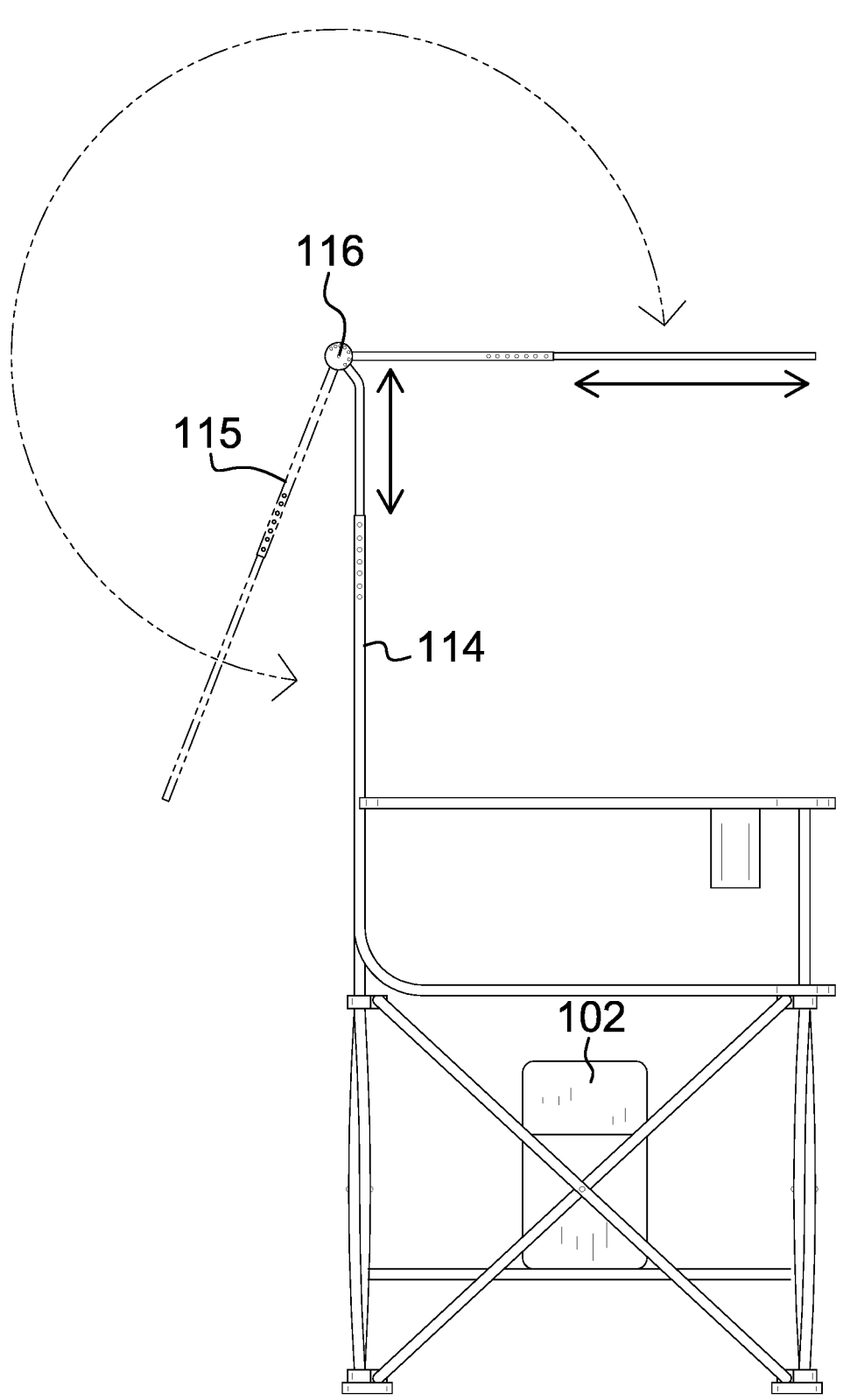
FIG. 7 is an in-use view of an embodiment of the disclosure.
Figure 8:
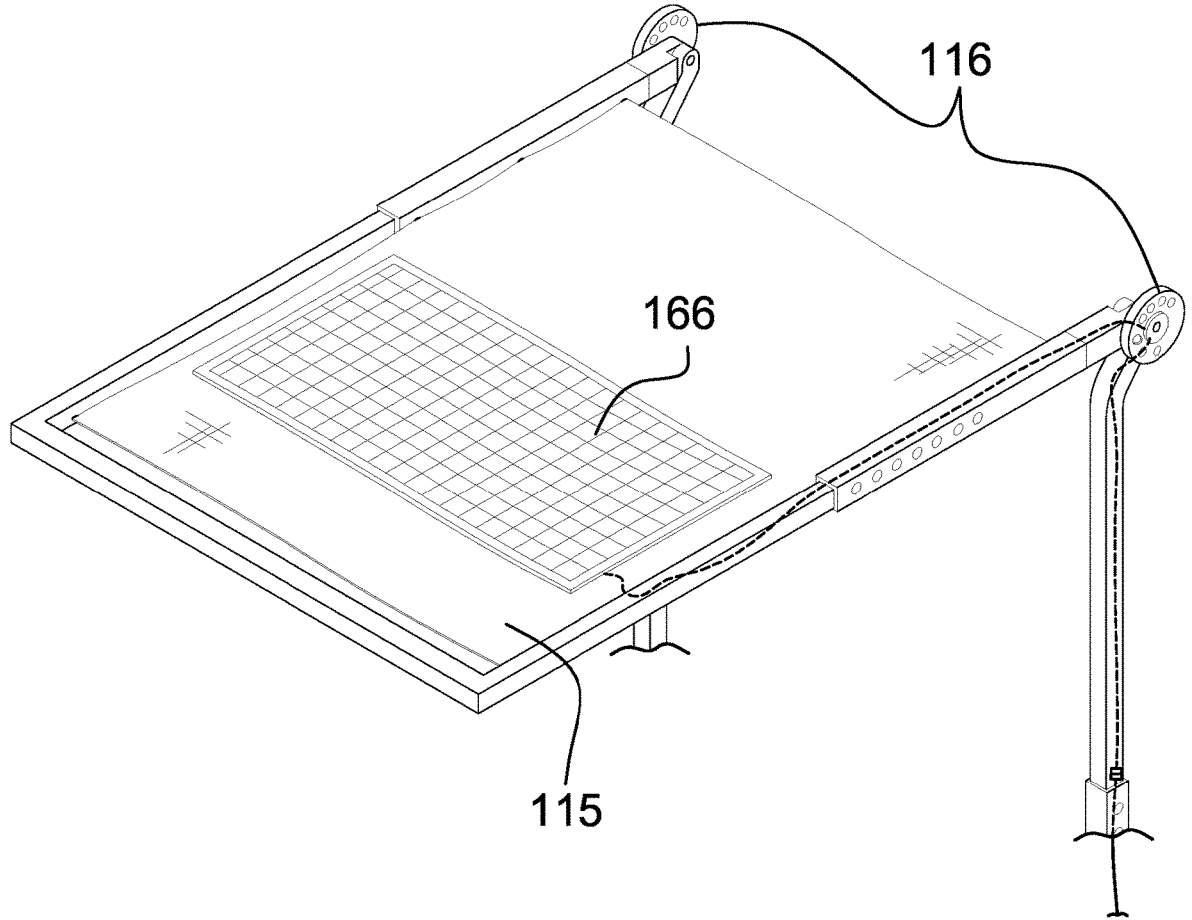
FIG. 8 is a detail view of an embodiment of the disclosure.
Figure 9:
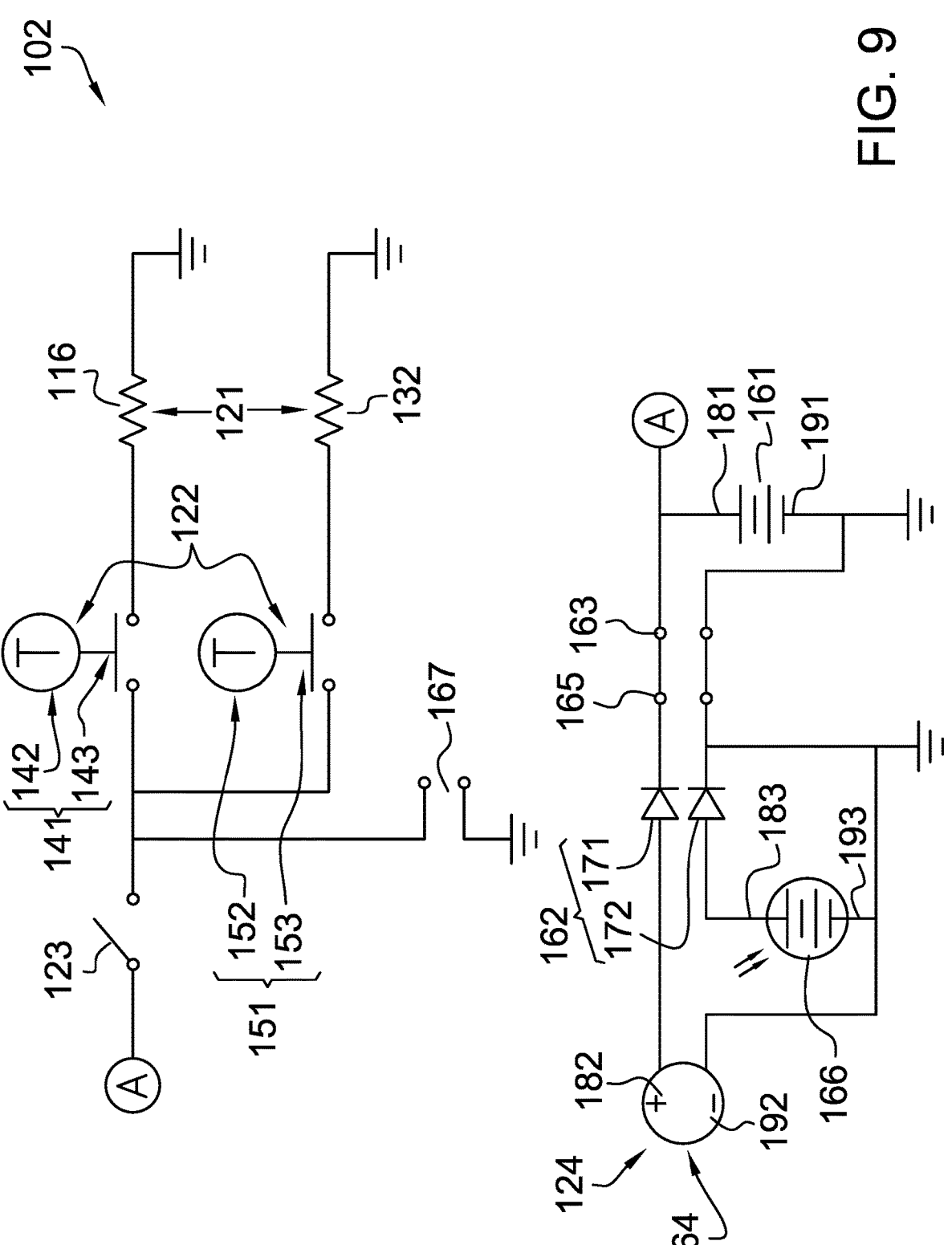
FIG. 9 is a schematic view of an embodiment of the disclosure.

Detailed reference will now be made to one or more potential embodiments of the disclosure, which are illustrated in FIGS. 1 through 9.

The solar-charged and heated folding chair 100 (hereinafter invention) is a chair. The invention 100 comprises a chair structure 101 and a heating circuit 102. The heating circuit 102 mounts on the chair structure 101. The chair structure 101 is a collapsible structure. The heating circuit 102 is an electric circuit. The heating circuit 102 generates heat used to warm an occupant of the chair structure 101. The heating circuit 102 is independently powered. By independently powered is meant that the heating circuit 102 can operate without an electrical connection to an external power source.

The chair structure 101 is a furniture item. The chair structure 101 forms a chair used for seating an individual. The chair structure 101 forms a collapsible structure. The chair structure 101 comprises a back support structure 111, a bench 112, and a pedestal 113.

The back support structure 111 is a vertically oriented supporting structure. The back support structure 111 is a load bearing structure. The back support structure 111 supports the back of an individual using the chair structure 101. The back support structure 111 further comprises a backrest 114, a sunshade 115, and a hinge 116.

The backrest 114 is a flexible sheeting structure. The backrest 114 attaches to the pedestal 113. The backrest 114 is a load bearing structure. The backrest 114 forms the supports the back of an individual using the chair structure 101.

The sunshade 115 is a mechanical structure. The sunshade 115 is a rotating structure. The sunshade 115 attaches to the pedestal 113 such that the sunshade 115 rotates relative to the backrest 114. The sunshade 115 rotates into a horizontally oriented position that provides shade and rain protection to an individual sitting in the chair structure 101. The sunshade 115 rotates into a vertically oriented position that is posterior to the backrest 114 when the sunshade 115 is not in use.

The hinge 116 is a fastening device. The hinge 116 is a rotating structure. The hinge 116 attaches the sunshade 115 to the pedestal 113 such that the sunshade 115 rotates relative to the backrest 114.

The bench 112 is a horizontally oriented structure. The bench 112 is a flexible sheeting structure. The bench 112 is a load bearing structure. The bench 112 is an elevated structure. The bench 112 elevates a sitting individual above a supporting surface.

The pedestal 113 is a framework. The back support structure 111 and the bench 112 attach to the pedestal 113. The pedestal 113 is a load bearing structure. The pedestal 113 elevates the back support structure 111 above the supporting surface. The pedestal 113 elevates the bench 112 above the supporting surface. 18

The heating circuit 102 is an electric circuit. The heating circuit 102 generates heat used to warm the backrest 114 of the chair structure 101. The heating circuit 102 generates heat used to warm the bench 112 of the chair structure 101. The heating circuit 102 measures the temperature of the backrest 114. The heating circuit 102 measures the temperature of the bench 112. The heating circuit 102 maintains the temperature of the backrest 114 at a previously determined temperature. The heating circuit 102 maintains the temperature of the bench 112 at a previously determined temperature. The previously determined temperature maintained by the heating circuit 102 for the backrest 114 is adjustable. The previously determined temperature maintained by the heating circuit 102 for the bench 112 is adjustable.

The heating circuit 102 comprises a plurality of heating elements 121, a plurality of thermostats 122, a master switch 123, and a power circuit 124. The plurality of heating elements 121, the plurality of thermostats 122, the master switch 123, and the power circuit 124 are electrically interconnected.

Each of the plurality of heating elements 121 is an electrical device. Each of the plurality of heating elements 121 converts electric energy into heat. Each of the plurality of heating elements 121 generates heat used to warm a structure selected from the group consisting of: a) the backrest 114 of the back support structure 111; and, b) the bench 112. The plurality of heating elements 121 further comprises a first heating element 131 and a second heating element 132.

The first heating element 131 is the heating element selected from the plurality of heating elements 121 that mounts on the backrest 114 of the back support structure 111. The first heating element 131 is a resistive heating device that warms the backrest 114. The second heating element 132 is the heating element selected from the plurality of heating elements 121 that mounts on the bench 112. The second heating element is a resistive heating device that warms the bench 112.

Each of the plurality of thermostats 122 is an electrical device. The thermostat is defined elsewhere in this disclosure. Each of the plurality of thermostats 122 controls the operation of a heating element selected from the plurality of heating elements 121. Each of the plurality of thermostats 122 measures the temperature of the heat generated by its associated heating element. Each of the plurality of thermostats 122 controls temperature of its associated heating element by controlling the flow of electricity through its associated heating element. Each of the plurality of thermostats 122 maintains the previously determined temperature for its associated heating element. The plurality of thermostats 122 further comprises a first thermostat 141 and a second thermostat 151.

The first thermostat 141 is an electrical device. The first thermostat 141 maintains the first heating element 131 at the previously determined temperature selected for the first heating element 131. The first thermostat 141 further comprises a first temperature sensor 142 and a first switch element 143.

The first temperature sensor 142 is a temperature sensor. The first temperature sensor 142 mounts in the backrest 114. The first temperature sensor 142 measure the temperature of the first heating element 131. The first temperature sensor 142 compares the measured temperature of the first heating element 131 against a previously determined temperature. The first temperature sensor 142 sends an electric signal to the first switch element 143 that opens and closes the first switch element 143. The first switch element 143 is opened and closed based on the calculated difference between the measured temperature of the first heating element 131 and the previously determined temperature for the first heating element 131.

The first switch element 143 is an electrically controlled switch. The first switch element 143 electrically connects to the first temperature sensor 142. The first switch element 143 electrically connects the master switch 123 to the first heating element 131. The first switch element 143 actuates between an open position and a closed position based on an electric signal generated by the first temperature sensor 142.

The second thermostat 151 is an electrical device. The second thermostat 151 maintains the second heating element 132 at the previously determined temperature selected for the second heating element 132. The second thermostat 151 further comprises a second temperature sensor 152 and a second switch element 153.

The second temperature sensor 152 is a temperature sensor. The second temperature sensor 152 mounts in the bench 112. The second temperature sensor 152 measure the temperature of the second heating element 132. The second temperature sensor 152 compares the measured temperature of the second heating element 132 against a previously determined temperature. The second temperature sensor 152 sends an electric signal to the second switch element 153 that opens and closes the second switch element 153. The second switch element 153 is opened and closed based on the calculated difference between the measured temperature of the second heating element 132 and the previously determined temperature for the second heating element 132.

The second switch element 153 is an electrically controlled switch. The second switch element 153 electrically connects to the second temperature sensor 152. The second switch element 153 electrically connects the master switch 123 to the second heating element 132. The second switch element 153 actuates between an open position and a closed position based on an electric signal generated by the second temperature sensor 152.

The master switch 123 is an electrical device. The master switch 123 forms an electrical connection between the power circuit 124 and the first switch element 143 of the first thermostat 141. The master switch 123 forms an electrical connection between the power circuit 124 and the second switch element 153 of the second thermostat 151. The master switch 123 enables and disables the operation of each of the plurality of heating elements 121. The master switch 123 is effectively the power switch of the invention 100.

The power circuit 124 is an electrical circuit. The power circuit 124 powers the operation of the heating circuit 102. The power circuit 124 is an electrochemical device. The power circuit 124 converts chemical potential energy into the electrical energy required to power the heating circuit 102. The power circuit 124 further comprises a battery 161, a plurality of diodes 162, a charging port 163, an external power source 164, a photovoltaic cell 166, and an extension port 167. The external power source 164 further comprises a charging plug 165. The battery 161, the plurality of diodes 162, the charging port 163, the external power source 164, the charging plug 165, the photovoltaic cell 166, and the extension port 167 are electrically interconnected. The battery 161 further comprises a first positive terminal 181 and a first negative terminal 191. The external power source 164 further comprises a second positive terminal 182 and a second negative terminal 192. The photovoltaic cell 166 further comprises a third positive terminal 183 and a third negative terminal 193.

Each of the plurality of diodes 162 is an electrical device known as a diode. The diode is defined elsewhere in this disclosure. Each of the plurality of diodes 162 controls the direction of flow of electric current through the power circuit 124. The plurality of diodes 162 further comprises a first diode 171 and a second diode 172.

The battery 161 is an electrochemical device. The battery 161 converts chemical potential energy into the electrical energy used to power the heating circuit 102. The battery 161 is a commercially available rechargeable battery 161. The chemical energy stored within the rechargeable battery 161 is renewed and restored through use of the charging port 163. The charging port 163 is an electrical circuit that reverses the polarity of the rechargeable battery 161 and provides the energy necessary to reverse the chemical processes that the rechargeable battery 161 initially used to generate the electrical energy. This reversal of the chemical process creates a chemical potential energy that will later be used by the rechargeable battery 161 to generate electricity.

The charging port 163 forms an electrical connection to an external power source 164 using a charging plug 165. The charging plug 165 forms a detachable electrical connection with the charging port 163. The charging port 163 receives electrical energy from the external power source 164 through the charging plug 165. The first diode 171 is an electrical device that allows current to flow in only one direction. The first diode 171 installs between the rechargeable battery 161 and the charging port 163 such that electricity will not flow from the first positive terminal 181 of the rechargeable battery 161 into the second positive terminal 182 of the external power source 164. In the first potential embodiment of the disclosure, the external power source 164, the charging plug 165, and the 8 charging port 163 are compatible with USB power requirements.

The photovoltaic cell 166 is an electrical device that converts light into electrical energy. The photoelectric cell 166 mounts on the sunshade 115. The chemical energy stored within the rechargeable battery 161 is further renewed and restored through use of the photovoltaic cell 166. The photovoltaic cell 166 is directly wired to the battery 161. The photovoltaic cell 166 is an electrical circuit that reverses the polarity of the rechargeable battery 161 and provides the energy necessary to reverse the chemical processes that the rechargeable battery 161 initially used to generate the electrical energy. This reversal of the chemical process creates a chemical potential energy that will later be used by the rechargeable battery 161 to generate electricity.

The second diode 172 is an electrical device that allows current to flow in only one direction. The second diode 172 installs between the rechargeable battery 161 and the charging port 163 such that electricity will not flow from the first positive terminal 181 of the rechargeable battery 161 into the third positive terminal 183 of photovoltaic cell 166. The second diode 172 simultaneously installs between the photovoltaic cell 166 and the charging port 163 such that electricity will not flow from the second positive terminal 182 of the external power source 164 into the third positive terminal 183 of the photovoltaic cell 166. The photovoltaic cell 166 is defined elsewhere in this disclosure.

The battery 161 also powers the operation of the extension port 167. The extension port 167 is an electric port that provides access to the electric energy that is available in the battery 161.

The following definitions were used in this disclosure:

Anterior: As used in this disclosure, anterior is a term that is used to refer to the front side or direction of a structure. When comparing two objects, the anterior object is the object that is closer to the front of the structure.

Armrest: As used in this disclosure, an armrest is a structure formed along a lateral side of a chair. The armrest forms a structure on which a person can place an arm.

Backrest: As used in this disclosure, a backrest is a vertical or vertically canted supporting surface formed along the posterior side of a chair. The backrest supports the back of a person sitting in the chair.

Battery: As used in this disclosure, a battery is a chemical device consisting of one or more cells, in which chemical energy is converted into electricity and used as a source of power. Batteries are commonly defined with a positive terminal and a negative terminal.

Bench: As used in this disclosure, a bench is a horizontal supporting surface formed by a chair.

Chair: As used in this disclosure, a chair is a structure that a person can sit on. The horizontal resting surface a person sits on is called the bench. Seat is a common synonym for a chair. See bench, backrest, headrest, and armrest.

Collapsible: As used in this disclosure, the terms collapsible refers to an object that is configured such that the volume of the object is adjustable. By volume is meant the volume of the perimetrical boundary that contains the object. The verbs collapse and retract mean that the volume of the perimetrical boundary of the object changes from a larger volume to a smaller volume. The verbs expand and deploy mean that the volume of the perimetrical boundary of the object changes from a smaller volume to a larger volume.

Control Circuit: As used in this disclosure, a control circuit is an electrical circuit that manages and regulates the behavior or operation of a device.

Diode: As used in this disclosure, a diode is a two terminal semiconductor device that allows current flow in only one direction. The two terminals are called the anode and the cathode. Electric current is allowed to pass from the anode to the cathode.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Flexible: As used in this disclosure, flexible refers to an object or material that will deform when a force is applied to it but that will not necessarily return to its original shape when the deforming force is removed.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Framework: As used in this disclosure, a framework refers to the substructure of an object that forms the load path for the object.

Heating Element: As used in this disclosure, a heating element is a resistive wire that is used to convert electrical energy into heat. Common metal combinations used to form heat elements include a combination of nickel and Chromium (typical: 80/20), a combination of iron, chromium, and aluminum (typical 70/25/5), a combination of copper, nickel, iron, and manganese (typical 66/30/2/2) (use for continuously hot), and platinum.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Housing: As used in this disclosure, a housing is a rigid structure that encloses and protects one or more devices.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Maintained Switch: As used in this disclosure, a maintained switch is a switch that maintains the position that was set in the most recent switch actuation. A maintained switch works in an opposite manner to a momentary switch.

Pedestal: As used in this disclosure, a pedestal is an intermediary load bearing structure that forms a load path between a supporting surface and an object, structure, or load.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Plug: As used in this disclosure, a plug is an electrical termination that electrically connects a first electrical circuit to a second electrical circuit or a source of electricity. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Posterior: As used in this disclosure, posterior is a term that is used to refer to the side of an object that is distal or in the opposite direction of the anterior side. When comparing two items, the posterior item is the item that is distal from the anterior of the object.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Textile: As used in this disclosure, a textile is a material that is woven, knitted, braided, or felted. Synonyms in common usage for this definition include fabric and cloth. The two surfaces of the textile with the greatest surface area are called the faces of the textile.

Thermostat: As used in this disclosure, a thermostat is a device that monitors the temperature of a space such that the thermostat 1) operates a switch when the measured temperature exceeds or falls below a first preset temperature; and, 2) performs the opposite operation on the switch when the measured temperature falls below or exceeds a second preset temperature. The thermostat is well-known and documented in the electrical arts.

USB: As used in this disclosure, USB is an acronym for Universal Serial Bus which is an industry standard that defines the cables, the connectors, the communication protocols, and the distribution of power required for interconnections between electronic devices. The USB standard defines several connectors including, but not limited to, USB-A, USB-B, mini-USB, and micro USB connectors. A USB cable refers to a cable that: 1) is terminated with USB connectors; and, 2) that meets the data transmission standards of the USB standard.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 9 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A solar-charged and heated folding chair comprising
a chair structure and a heating circuit;
wherein the heating circuit mounts on the chair structure;
wherein the heating circuit generates heat used to warm an occupant of the chair structure;
wherein the chair structure comprises a backrest, a bench, and a pedestal;
wherein the backrest and the bench attach to the pedestal;
wherein the heating circuit comprises a plurality of heating elements, a plurality of thermostats, a master switch, and a power circuit;
wherein the plurality of heating elements, the plurality of thermostats, the master switch, and the power circuit are electrically interconnected;
wherein the backrest further comprises a sunshade, and a hinge;
wherein the master switch forms an electrical connection between the power circuit and a first switch element of the first thermostat;
wherein the master switch forms an electrical connection between the power circuit and a second switch element of the second thermostat;
wherein the master switch enables and disables the operation of each of the plurality of heating elements.

2. The solar-charged and heated folding chair according to claim 1 wherein the solar-charged and heated folding chair is a chair;
wherein the chair structure is a collapsible structure;
wherein the heating circuit is an electric circuit;
wherein the heating circuit is independently powered;
wherein by independently powered is meant that the heating circuit can operate without an electrical connection to an external power source;
wherein the chair structure forms a collapsible structure.

3. The solar-charged and heated folding chair according to claim 2 wherein the heating circuit is an electric circuit;
wherein the heating circuit generates heat used to warm the backrest of the chair structure;
wherein the heating circuit generates heat used to warm the bench of the chair structure;
wherein the heating circuit measures a temperature of the backrest;
wherein the heating circuit measures a temperature of the bench;
wherein the heating circuit maintains the temperature of the backrest at a previously determined temperature;
wherein the heating circuit maintains the temperature of the bench at a previously determined temperature;
wherein the previously determined temperature maintained by the heating circuit for the backrest is adjustable;
wherein the previously determined temperature maintained by the heating circuit for the bench is adjustable.

4. The solar-charged and heated folding chair according to claim 3
wherein the backrest is a vertically oriented supporting structure;
wherein the backrest is a load bearing structure;
wherein the backrest supports the back of an individual using the chair structure.

5. The solar-charged and heated folding chair according to claim 4
wherein the bench is a horizontally oriented structure;
wherein the bench is a flexible sheeting structure;
wherein the bench is a load bearing structure;
wherein the bench is an elevated structure;
wherein the bench elevates a sitting individual above a supporting surface.

6. The solar-charged and heated folding chair according to claim 5
wherein the pedestal is a framework;
wherein the pedestal is a load bearing structure;
wherein the pedestal elevates the backrest above the supporting surface;
wherein the pedestal elevates the bench above the supporting surface.

7. The solar-charged and heated folding chair according to claim 6
wherein the backrest is a flexible sheeting structure;
wherein the backrest attaches to the pedestal;
wherein the backrest is a load bearing structure;
wherein the backrest forms the supports the back of an individual using the chair structure;
wherein the sunshade is a mechanical structure;
wherein the sunshade is a rotating structure;
wherein the sunshade attaches to the pedestal such that the sunshade rotates relative to the backrest;
wherein the sunshade rotates into a horizontally oriented position that provides shade and rain protection to an individual sitting in the chair structure;
wherein the sunshade rotates into a vertically oriented position that is posterior to the backrest when the sunshade is not in use;
wherein the hinge is a fastening device;
wherein the hinge is a rotating structure;
wherein the hinge attaches the sunshade to the pedestal such that the sunshade rotates relative to the backrest.

8. The solar-charged and heated folding chair according to claim 7
wherein each of the plurality of heating elements is an electrical device;

wherein each of the plurality of heating elements converts electric energy into heat;

wherein each of the plurality of heating elements generates heat used to warm a structure selected from the group consisting of: a) the backrest; and, b) the bench.

9. The solar-charged and heated folding chair according to claim 8 wherein each of the plurality of thermostats is an electrical device;

wherein each of the plurality of thermostats controls the operation of a heating element selected from the plurality of heating elements;

wherein each of the plurality of thermostats measures the temperature of the heat generated by its associated heating element;

wherein each of the plurality of thermostats controls temperature of its associated heating element by controlling the flow of electricity through its associated heating element;

wherein each of the plurality of thermostats maintains the previously determined temperature for its associated heating element.

10. The solar-charged and heated folding chair according to claim 9 wherein the plurality of heating elements further comprises a first heating element and a second heating element;

wherein the first heating element is the heating element selected from the plurality of heating elements that mounts on the backrest of the backrest;

wherein the first heating element is a resistive heating device that warms the backrest;

wherein the second heating element is the heating element selected from the plurality of heating elements that mounts on the bench;

wherein the second heating element is a resistive heating device that warms the bench.

11. The solar-charged and heated folding chair according to claim 10 wherein the plurality of thermostats further comprises a first thermostat and a second thermostat;

wherein the first thermostat is an electrical device;

wherein the first thermostat maintains the first heating element at the previously determined temperature selected for the first heating element;

wherein the second thermostat is an electrical device;

wherein the second thermostat maintains the second heating element at the previously determined temperature selected for the second heating element.

12. The solar-charged and heated folding chair according to claim 11 wherein the master switch is an electrical device.

13. The solar-charged and heated folding chair according to claim 12 wherein the power circuit is an electrical circuit;

wherein the power circuit powers the operation of the heating circuit;

wherein the power circuit is an electrochemical device;

wherein the power circuit converts chemical potential energy into the electrical energy required to power the heating circuit.

14. The solar-charged and heated folding chair according to claim 13 wherein the first thermostat further comprises a first temperature sensor and the first switch element;

wherein the first temperature sensor is a temperature sensor;

wherein the first temperature sensor mounts in the backrest;

wherein the first temperature sensor measure the temperature of the first heating element;

wherein the first temperature sensor compares the measured temperature of the first heating element against a previously determined temperature;

wherein the first temperature sensor sends an electric signal to the first switch element that opens and closes the first switch element;

wherein the first switch element is opened and closed based on the calculated difference between the measured temperature of the first heating element and the previously determined temperature for the first heating element;

wherein the first switch element is an electrically controlled switch;

wherein the first switch element electrically connects to the first temperature sensor;

wherein the first switch element electrically connects the master switch to the first heating element;

wherein the first switch element actuates between an open position and a closed position based on an electric signal generated by the first temperature sensor;

wherein the second thermostat further comprises a second temperature sensor and the second switch element;

wherein the second temperature sensor is a temperature sensor;

wherein the second temperature sensor mounts in the bench;

wherein the second temperature sensor measure the temperature of the second heating element;

wherein the second temperature sensor compares the measured temperature of the second heating element against a previously determined temperature;

wherein the second temperature sensor sends an electric signal to the second switch element that opens and closes the second switch element;

wherein the second switch element is opened and closed based on the calculated difference between the measured temperature of the second heating element and the previously determined temperature for the second heating element;

wherein the second switch element is an electrically controlled switch;

wherein the second switch element electrically connects to the second temperature sensor;

wherein the second switch element electrically connects the master switch to the second heating element;

wherein the second switch element actuates between an open position and a closed position based on an electric signal generated by the second temperature sensor.

15. The solar-charged and heated folding chair according to claim 14 wherein the power circuit further comprises a battery, a plurality of diodes, a charging port, an external power source, a photovoltaic cell, and an extension port;

wherein the external power source further comprises a charging plug;

wherein the battery, the plurality of diodes, the charging port, the external power source, the charging plug, the photovoltaic cell, and the extension port are electrically interconnected;

wherein the battery further comprises a first positive terminal and a first negative terminal;

wherein the external power source further comprises a second positive terminal and a second negative terminal;

wherein the photovoltaic cell further comprises a third positive terminal and a third negative terminal;

wherein each of the plurality of diodes is an electrical device known as a diode;

wherein each of the plurality of diodes controls the direction of flow of electric current through the power circuit.

16. The solar-charged and heated folding chair according to claim 15 wherein the battery is a rechargeable battery;

wherein the charging port is an electrical circuit that reverses the polarity of the rechargeable battery;

wherein this reversal of the chemical process creates a chemical potential energy that will later be used by the rechargeable battery to generate electricity;

wherein the charging port forms an electrical connection to an external power source using a charging plug;

wherein the charging plug forms a detachable electrical connection with the charging port;

wherein the charging port receives electrical energy from the external power source through the charging plug;

wherein the plurality of diodes further comprises a first diode and a second diode;

wherein the first diode is an electrical device that allows current to flow in only one direction;

wherein the first diode installs between the rechargeable battery and the charging port such that electricity will not flow from the first positive terminal of the rechargeable battery into the second positive terminal of the external power source;

wherein the photovoltaic cell is an electrical device that converts light into electrical energy;

wherein the photoelectric cell mounts on the sunshade;

wherein the photovoltaic cell is directly wired to the battery;

wherein the photovoltaic cell is an electrical circuit that reverses the polarity of the rechargeable battery;

wherein the second diode is an electrical device that allows current to flow in only one direction;

wherein the second diode installs between the rechargeable battery and the charging port such that electricity will not flow from the first positive terminal of the rechargeable battery into the third positive terminal of photovoltaic cell;

wherein the second diode simultaneously installs between the photovoltaic cell and the charging port such that electricity will not flow from the second positive terminal of the external power source into the third positive terminal of the photovoltaic cell.

* * * * *